(12) United States Patent
Varma et al.

(10) Patent No.: US 9,606,595 B2
(45) Date of Patent: Mar. 28, 2017

(54) MICROPROCESSOR-ASSISTED AUTO-CALIBRATION OF VOLTAGE REGULATORS

(75) Inventors: Ankush Varma, Hillsboro, OR (US); Jeremy J. Shrall, Portland, OR (US); Krishnakanth Venkata Sistla, Beaverton, OR (US); Avinash N. Ananthakrishnan, Hillsboro, OR (US); Vivek Garg, Folsom, CA (US); Christopher A. Poirier, Sr., Fort Collins, CO (US); Martin T. Rowland, Beaverton, OR (US); Edward R. Stanford, DuPont, WA (US)

(73) Assignee: Intel Corporation, Santa Clara, CA (US)

( * ) Notice: Subject to any disclaimer, the term of this patent is extended or adjusted under 35 U.S.C. 154(b) by 590 days.

(21) Appl. No.: 13/994,065

(22) PCT Filed: Dec. 30, 2011

(86) PCT No.: PCT/US2011/068228
§ 371 (c)(1),
(2), (4) Date: Jun. 13, 2013

(87) PCT Pub. No.: WO2013/101225
PCT Pub. Date: Jul. 4, 2013

(65) Prior Publication Data
US 2013/0339777 A1 Dec. 19, 2013

(51) Int. Cl.
*G06F 1/26* (2006.01)
*G06F 1/32* (2006.01)
*G06F 11/30* (2006.01)

(52) U.S. Cl.
CPC .................. *G06F 1/26* (2013.01); *G06F 1/32* (2013.01); *G06F 1/3206* (2013.01);
(Continued)

(58) Field of Classification Search
CPC . G06F 1/26; G06F 1/32; G06F 1/3206; G06F 1/3293; G06F 1/3296; G06F 11/3024; G06F 11/3058; G06F 21/50
(Continued)

(56) References Cited

U.S. PATENT DOCUMENTS 7,984,446 B1 * 7/2011 Lilliebjerg ................... 718/103
2002/0049920 A1 4/2002 Staiger
(Continued)

FOREIGN PATENT DOCUMENTS

CN 101578565 A 11/2009

OTHER PUBLICATIONS

PCT International Search Report for PCT Counterpart Application No. PCT/US2011/068228, 3 pgs., (Sep. 19, 2012).
(Continued)

*Primary Examiner* — Michael J Brown
(74) *Attorney, Agent, or Firm* — Nicholson De Vos Webster & Elliott LLP

(57) ABSTRACT

Dynamic runtime calibration of a processor with respect to a specific voltage regulator that powers the processor or a memory subsystem coupled to the processor can reduce or eliminate the need for guardbands in power management computations. The processor receives a current measurement from the voltage regulator and computes a calibration factor based on the measured value and a stored expected value. The calibration factor can be used in making power management decisions instead of adding the guardband to power readings. A manufacturer or distributor of the processor can compute the stored values with a controlled voltage supply that has a higher precision than typical commercial power supplies used in computing systems. The computed, stored values indicate the expected value, which
(Continued)

can be used to determine a calibration factor relative to a voltage regulator of an active system.

30 Claims, 12 Drawing Sheets

(52) U.S. Cl.
CPC .......... *G06F 1/3293* (2013.01); *G06F 1/3296* (2013.01); *G06F 11/3024* (2013.01); *G06F 11/3058* (2013.01)

(58) Field of Classification Search
USPC ........................................ 713/300, 320, 340
See application file for complete search history.

(56) References Cited

U.S. PATENT DOCUMENTS

| | | | |
|---|---|---|---|
| 2007/0245317 A1 | 10/2007 | Hong et al. | |
| 2008/0168287 A1* | 7/2008 | Berry et al. | 713/323 |
| 2010/0007366 A1* | 1/2010 | Watanabe | G01R 31/31908 324/750.3 |
| 2011/0144818 A1 | 6/2011 | Li et al. | |
| 2011/0258477 A1* | 10/2011 | Baker | G06F 1/3203 713/600 |
| 2011/0320150 A1 | 12/2011 | David et al. | |

OTHER PUBLICATIONS

PCT Written Opinion of the International Searching Authority for PCT Counterpart Application No. PCT/US2011/068228, 5 pgs., (Sep. 19, 2012).

PCT Notification concerning Transmittal of International Preliminary Report on Patentability (Chapter I of the Patent Cooperation Treaty) for PCT Counterpart Application No. PCT/US2011/068228, 7 pgs., (Jul. 10, 2014).

First Office Action from counterpart Chinese Patent Application No. 2011180076369.5 mailed Mar. 25, 2016, 18 pages.

* cited by examiner

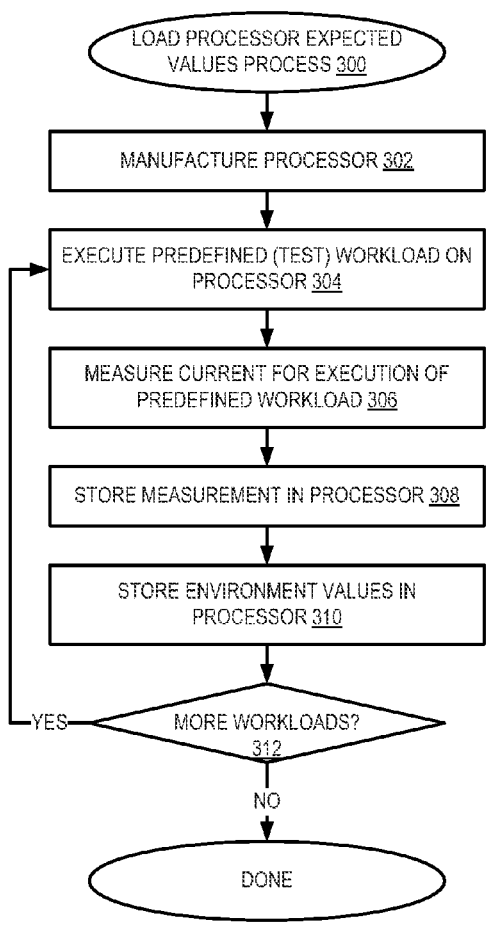
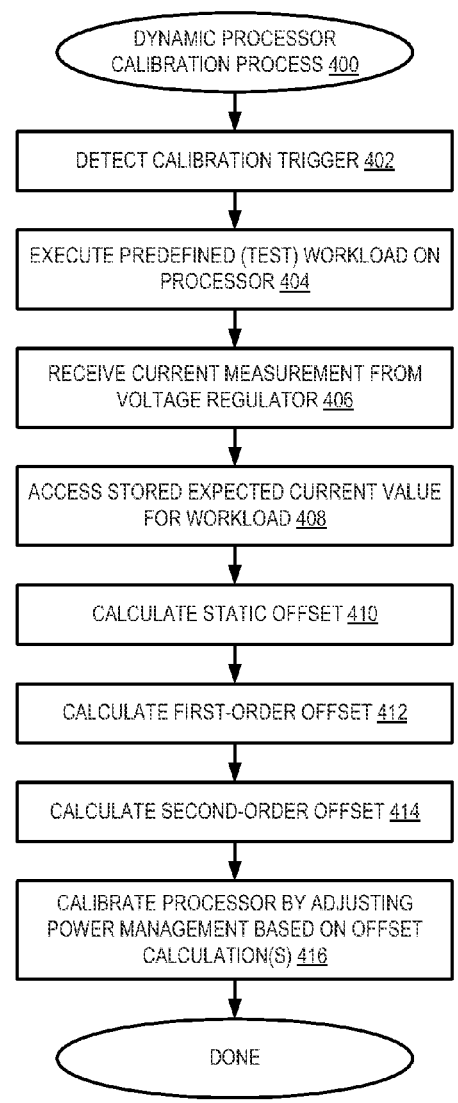
FIG. 3
FIG. 4

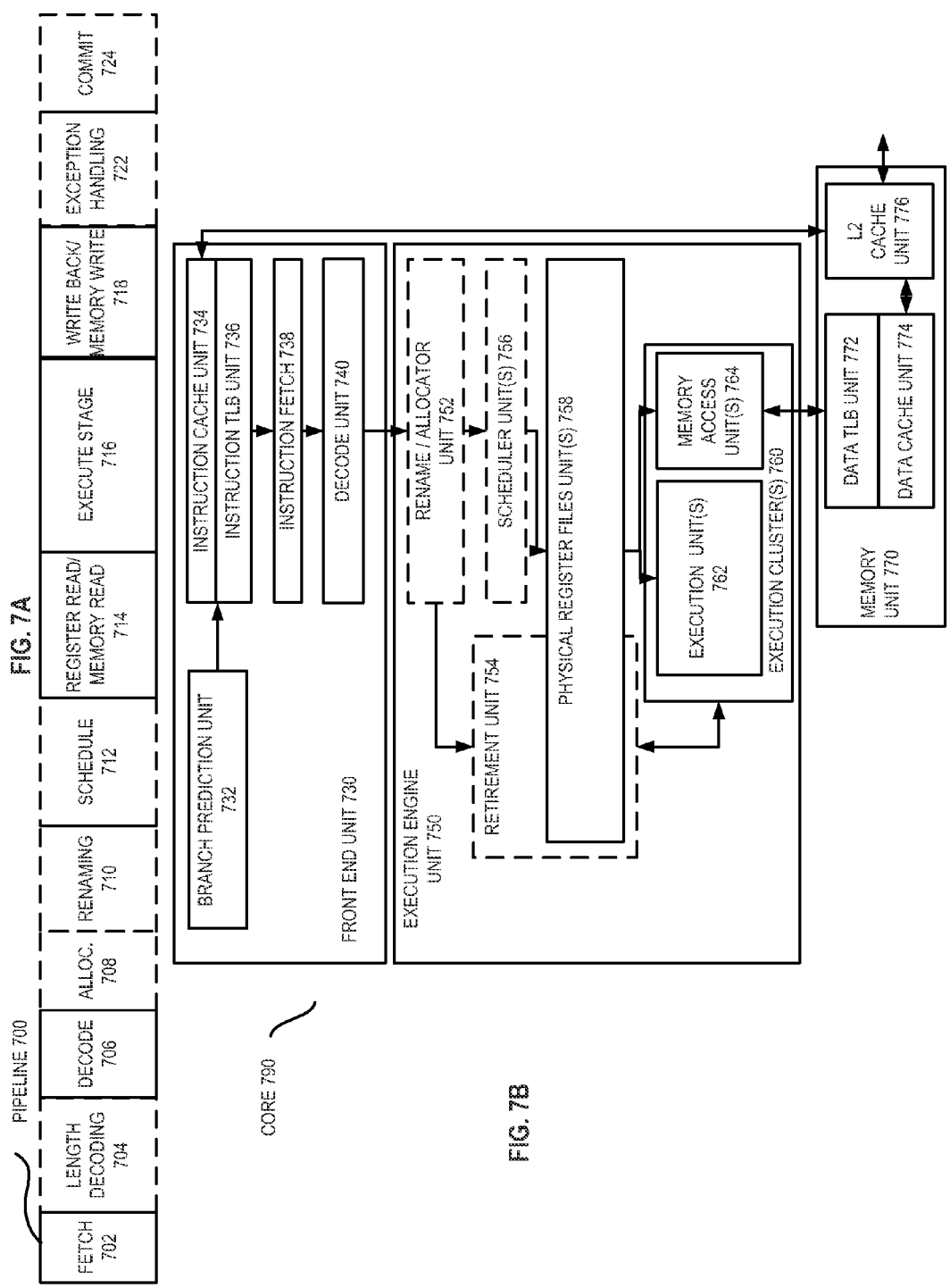

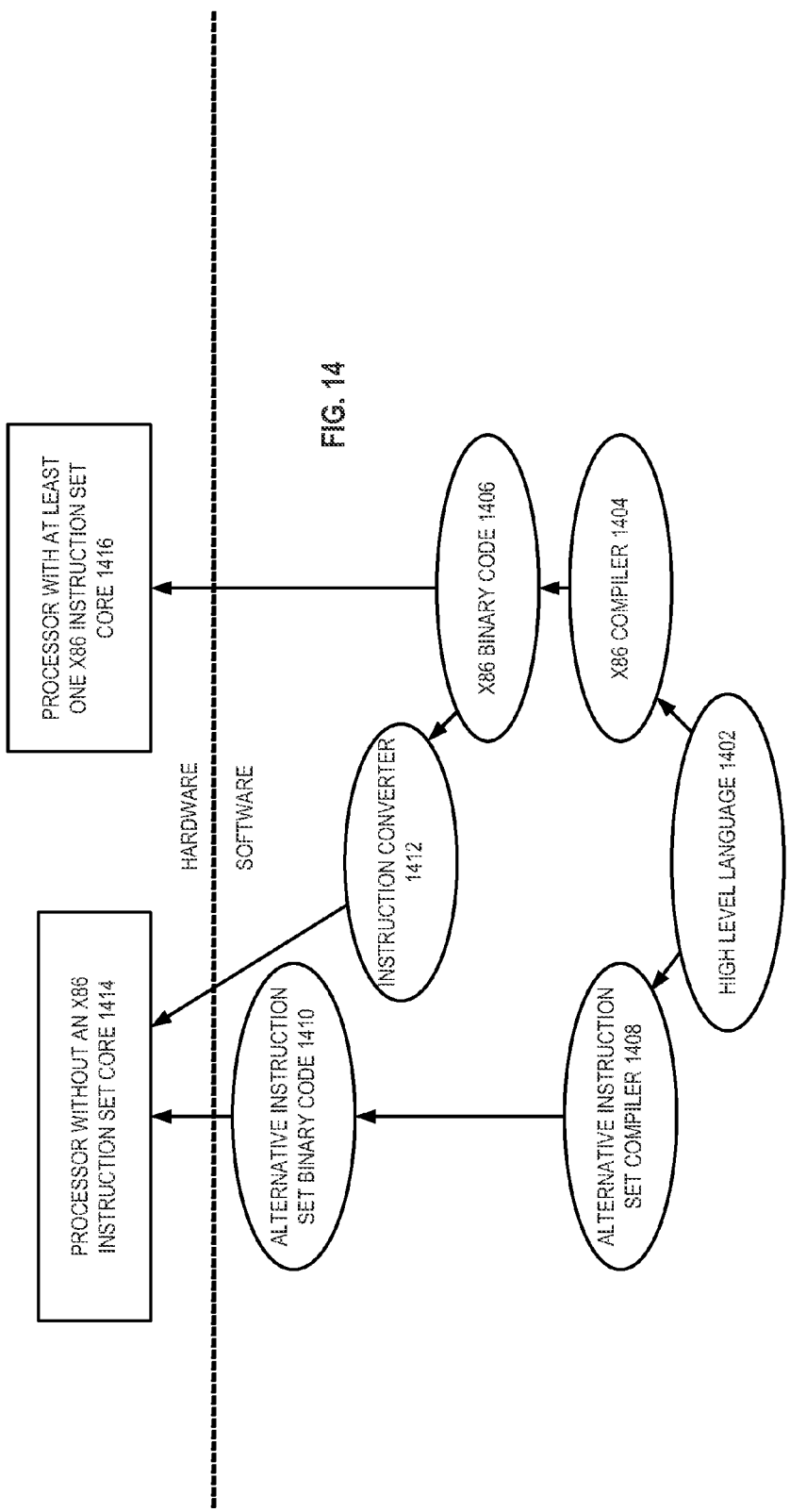

US 9,606,595 B2

MICROPROCESSOR-ASSISTED AUTO-CALIBRATION OF VOLTAGE REGULATORS

CROSS-REFERENCE TO RELATED APPLICATION

This patent application is a U.S. National Phase Application under 35 U.S.C. §371 of International Application No. PCT/US2011/068228, filed Dec. 30, 2011, entitled MICROPROCESSOR-ASSISTED AUTO-CALIBRATION OF VOLTAGE REGULATORS.

FIELD

Embodiments of the invention are generally related to power management, and more particularly to processor power consumption.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright© 2011, Intel Corporation, All Rights Reserved.

BACKGROUND

Many modern microprocessors rely on external on-board voltage regulators (VRs) to measure the current and power consumed by the processor, memory, or other on-platform components. VRs are typically rated for a certain error, which is typically introduced due to component tolerances in high volume manufacturing of VRs. Thus, there are inaccuracies in the current or power readings delivered by the VR due to part-to-part manufacturing variation.

To avoid damage, a component should never exceed its power rating. Traditionally, a "guardband" is conservatively applied to the VR power readings when making power management decisions. For typical (not worst-case) scenarios, the guardband directly translates to a performance loss. For example, if a 100 W component is supplied by a VR with a +/−5% error in its power or current reporting capability, the component is effectively limited to 95 W to leave room for possible errors. Such a 5 W loss in available power implies a reduced peak performance for the component.

Additionally, the performance of a VR tends to go down over time. Thus, even assuming that a VR operates at a particular power, the available power can fluctuate as the VR ages. Such VR fluctuation can cause stress on the component that lessens its expected lifespan.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

FIG. 3 is a flow diagram of an embodiment of a process for loading expected values for a processor onto the processor.

FIG. 4 is a flow diagram of an embodiment of a process for dynamically calibrating a processor to an associated voltage regulator.

FIG. 7A is a block diagram illustrating an embodiment of both an exemplary in-order pipeline and an exemplary register renaming, out-of-order issue/execution pipeline.

FIG. 7B is a block diagram illustrating an embodiment of both an exemplary embodiment of an in-order architecture core and an exemplary register renaming, out-of-order issue/execution architecture core to be included in a processor.

FIG. 14 is a block diagram of one embodiment contrasting the use of a software instruction converter to convert binary instructions in a source instruction set to binary instructions in a target instruction set.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

As described herein, dynamic runtime calibration of a processor with respect to a specific associated voltage regulator that powers the processor and/or the memory subsystem connected to the processor can reduce or eliminate the need to apply guardbands in power management computations. As described herein, an offset can be calculated that allows adjustment of the power management based on the reported measured power readings and the calculated offset. The process can thus auto-calibrate to its associated voltage regulator.

The processor receives a current measurement from the voltage regulator and computes an offset based on the measured value and a stored expected value. A manufacturer or distributor of the processor can compute the stored values with a controlled voltage supply that has a higher precision than typical commercial power supplies used in computing systems. The computed, stored values indicate the expected value, which can be used to determine an offset relative to a voltage regulator of an active system. In one embodiment, the auto-calibration is a boot-time calibration mechanism that reduces the error in the reported measured power readings, and allows application of more accurate power readings to power management in the processor platform.

The calibration mechanism as described herein does not require changes at the voltage regulator (VR). While changes could be made to the VR, as described herein the processor itself is used as a known load to the VR. In one embodiment, the microprocessor is set up at different load levels (or workload), and reads the current measurements taken by the VR at each load level over a processor-VR interface. In runtime of the processor (i.e., for a processor deployed in an active computing system of a consumer), the processor compares the VR measurements with its own stored values of the loads to compute correction factors for the VR.

Figure 1:
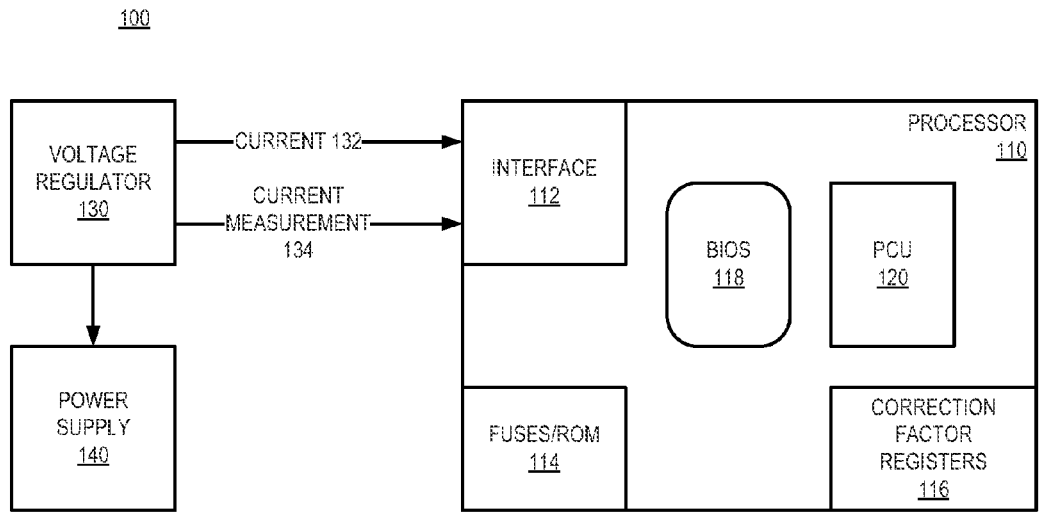
FIG. 1 is a block diagram of an embodiment of a system with a processor that auto-calibrates to an associated voltage regulator.

FIG. 1 is a block diagram of an embodiment of a system with a processor that auto-calibrates to an associated voltage regulator. System 100 includes processor 110 having associated voltage regulator (VR) 130. VR 130 receives power from power supply 140, and provides a regulated voltage to processor 110. It will be understood that a VR can be associated with more than one processor. It will also be understood that processor 110 can be a multi-core processor, and one or more cores can be a load for calibrating the processor to the VR.

VR 130 provides current 132 to processor 110, and includes one or more mechanisms to measure the current provided to the processor, as is known in the art. VR 130 can provide current measurement 134 to processor 110. Current measurement 134 represents any values or signals passed to processor 110 that are referred to herein as power readings.

In one embodiment, VR 130 is not associated with processor 110 in the sense of providing current 132 to processor 110. Instead, VR 130 provides power to a memory device (not shown). Thus, VR 130 provides current 132 to the memory device, and still communicates measurement 134 to processor 110. Processor 110 can compute one or more calibration factors (e.g., offsets) for the VR associated with the memory device, in accordance with any embodiment described herein. In such an embodiment, processor 110 would include expected values for a memory access (i.e., read and/or write) load for the memory device, which can be used to compute the calibration factors. It will be understood that the memory devices would be loaded on a platform on which processor 110 is disposed.

For processor-assisted calibration, processor 110 includes various components that provide the calibration functions. Processor 110 interfaces with VR 130 via interface 112. Interface 112 provides the ability of processor 110 to read VR current measurement 134. Processor 110 includes fuses or ROM (read-only memory) 114, or other storage, which stores values programmed during manufacturing. While fuses or a ROM can be used, processor 110 could alternatively use another memory or storage technology to store the values. Non-volatile memory would be less preferred due to the need to keep it powered.

BIOS 118 represents firmware that can be executed on processor 110. BIOS 118 is typically stored on a storage device separate from processor 110 and executed on the processor. In one embodiment, control firmware or software other than BIOS 118 is used to trigger the auto-calibration. A system-level secure process could be used, for example, in a management mode. To provide an accurate reading, processor 110 should only execute the same processes that were running when the stored values in ROM 114 were determined.

PCU (power control unit) 120 represents power management logic of processor 110. In one embodiment, PCU 120 includes logic such as state machines to manage power operations for processor 110. PCU 120 operates in conjunction with BIOS 118 or other control software/firmware to compute correction factors based on current measurement 134 and current 132. The correction factors are stored in correction factors registers 116. Registers 116 need to be accessible to whatever control program is executing to maintain the correction factors computed.

When processor 110 (also could be referred to as microprocessor 110) is manufactured, the manufacturer or a test entity or a distributor of processor 110 executes test programs at given load levels under controlled conditions (e.g., controlled voltage, temperature). The power dissipation can be carefully monitored by the test equipment and written to persistent storage such as ROM 114 associated with processor 110. In one embodiment, the testing equipment also determines scaling factors to adjust for temperature or other condition variation, and likewise stores such values in ROM 114 for potential use in calibration. Such scaling factors based on temperature and voltage can be referred to in one embodiment as values indicating an environment of the workload.

Thus, ROM 114 stores one or more expected or known values for one or more test patterns. At calibration, such as at boot time, BIOS or other control 118 can execute the same test patterns and compare the expected (stored) power values against current measurements 134 from VR 130. Based on the comparison, BIOS 118 computes correction factors and writes them to dedicated hardware registers 116. In another embodiment, the PCU can compute the correction factors and make it available to BIOS 118. BIOS 118 programs the correction factors to the dedicated hardware registers on subsequent boots of the processor 110. PCU 120 accesses the correction factors stored in register 116 and uses them to compensate for VR errors, and get more accurate readings to use in power calculations.

In one embodiment, PCU 120 applies the error correction factors to calculations related to power management in processor 110. In one embodiment, PCU 120 accounts for the conditions indicated by scaling factors stored in ROM 114 (when scaling factors or environment values are included).

It will be understood that in many processors, BIOS 118 obtains control of the processor during the normal boot sequence. BIOS 118 executes a startup sequence for the device in which processor 110 is placed. BIOS 118 can also trigger calibration of the VR on every device boot up, or keep a count of number of boots, or keep track of a date and perform auto-calibration based on a calendar/timing. The BIOS can run test programs similar to those that were run during manufacturing to create the "expected" values, and observe or monitor the VR current readings. Using the stored values of power consumption, and any correction factors, and the known voltage of operation, BIOS 118 can compute the expected value of electrical current that the processor actually consumed. In one embodiment, BIOS 118 uses several such readings to compute correction factors to be programmed. The correction factors are programmed by BIOS 118 to hardware registers 116. In one embodiment, correction factors include at least a signed static offset to add to the VR reading. The correction factors optionally include a slope factor or other higher-level correction factors.

Figure 2:
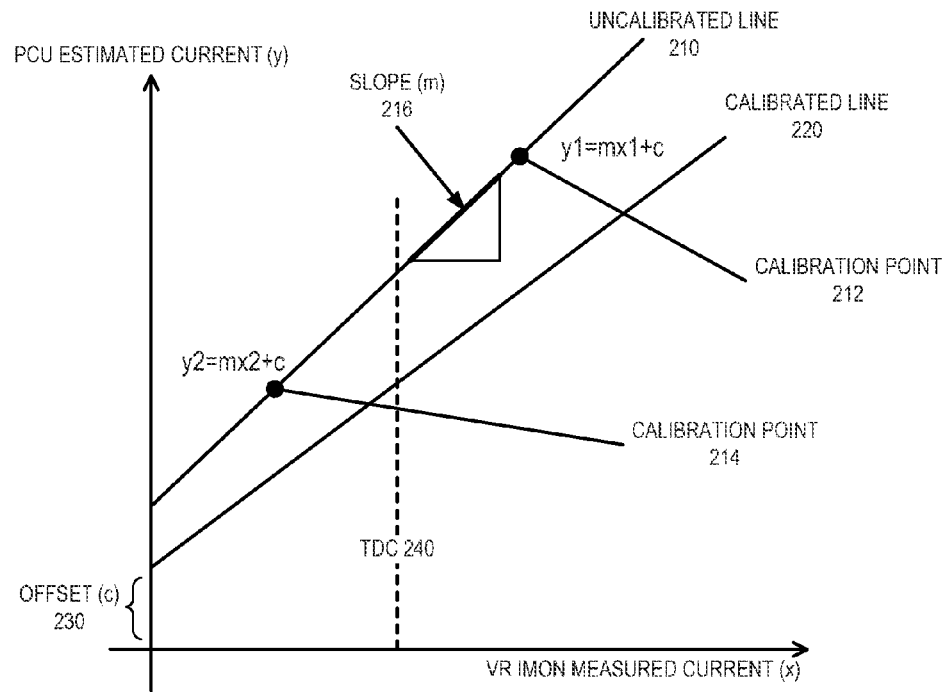
FIG. 2 is a representation of an embodiment of an uncalibrated and a calibrated current line for a processor and an associated voltage regulator.

FIG. 2 is a representation of an embodiment of an uncalibrated and a calibrated current line for a processor and an associated voltage regulator. The current-response lines could be one example of response lines for system 100. Other examples are possible. The x-axis shows VR monitored current ($I_{MON}$) measurements. The y-axis shows PCU estimated current, or expected current value as indicated by the stored values. Calibrated line 220 and uncalibrated line 210 represent current-response lines for a processor with an associated VR. It will be understood that the curves (lines) of the graph are not necessarily to scale. Calibrated line 220, if it were ideal, would be expected to have every point be of a form (x,y)=(x,x+c), where c is static offset 230. However, the slope of the ideal line and uncalibrated line 210 are not necessarily identical. In one embodiment, the slopes are different.

In one embodiment, the correction factors computed by the processor can include static offset 230, c. The slope of the lines may be close enough that the static offset may be the only offset factor calculated. In one embodiment, slope 216 (m) is computed for uncalibrated line 210 as a first-order calculation to provide more precise correction factors. In one embodiment, a second-order computation can be calculated to provide even more precise correction factors. Other, higher-order factors could also be calculated.

For power-management decisions made by the microprocessor (e.g., through the PCU), the corrected VR reading is used. The corrected VR reading can be determined by applying the calculated correction factors. In one embodiment, the corrected VR reading is given by: CORRECTED_CURRENT=OFFSET_CORRECTION+ UNCORRECTED_CURRENT*SLOPE_CORRECTION. In one embodiment, implementations where a slope is not provided can use a slope correction value of 1.0. Higher-level terms (such as UNCORRECTED_ CURRENT^2*QUAD_CORRECTION) can also be added for further accuracy. Based on the calibration correction factors, the processor can compensate for VR errors, resulting in corrected readings that are more accurate. Thus, the need for guardbands is reduced or eliminated, which results in improved peak performance and more precise power management. The actual correction factors can be computed using least-squares regression, best-fit analysis, two-point analysis, or other known mathematical techniques and heuristics.

The PCU executes during the manufacturing process to measure and store expected values. The PCU executes during runtime to perform computations related to auto-calibration. In one embodiment, the PCU runs calibration at two different current levels. More than two different current levels could be used in performing calibration computations. In one embodiment, at least one current level is selected on either side of TDC (thermal design current) 240. TDC is the steady state current drawn when the processor is executing at the TDP (thermal design power) level. When saying the current levels are chosen on either side of TDC, it will be understood that at least one level is chosen along the current-response line that is less than TDC 240, and another is chosen along the current-response line that is greater than TDC 240.

As shown in FIG. 2, calibration point 212 is at a level greater than TDC 240, while calibration point 214 is at a level less than TDC 240. Calibration point 212 can be defined as y1=mx1+c, while calibration point 214 can be defined as y2=mx2+c, where c is offset 230 (the static offset). The measured current in manufacturing can be fused in or otherwise set to a ROM during HVM (high-volume manufacturing) processing. The values used are based on a reference calibration workload (the predefined workload) at a reference voltage and temperature. In one embodiment, the HVM processing also stores parameters which indicate to the PCU how the stored current values scale with operating voltage and temperature.

In runtime (calibration), the PCU has for each calibration point an estimated current (y) stored to the processor, and a measured current from the VR (x). The PCU uses this information to compute offset values. In one embodiment, the PCU solves for m and c. The slope is the $I_{MON}$ error component that is a function of current drawn. The slope m can be calculated as m=(y2−y1)/(x2−x1). The static offset c can be calculated in a number of different ways. One way is to choose one of the calibration points and plug in m to solve for c. Alternatively, the PCU can independently calibrate offset using a low power test by putting the processor in the lowest power state at which VR $I_{MON}$ can still be sampled, measuring $I_{MON}$ reported current, and calculate the offset based on the reported current and the stored current for the low power state.

FIG. 3 is a flow diagram of an embodiment of a process for loading expected values for a processor onto the processor. Process 300 is a process to load process expected values in a storage associated with the processor. Process 300 could also be used to provide expected values for a memory device connected to the processor, which can allow the processor to calculate calibration factors for the VR associated with the memory device. In one embodiment, the storage is on the processor itself. In another embodiment, the storage is located off-chip from the processor, and is associated with and accessible to the processor.

A manufacturer manufactures a processor, 302. The manufacturing entity itself or another entity (e.g., a configuration/testing entity, or a processor distributor, or an OEM (original equipment manufacturer) that puts the processor in a system) configures the processor for later auto-calibration. The entity causes the processor to execute a predefined (e.g., test) workload on the processor, 304. The power supply connected to the processor can be carefully monitored for voltage, and the environment can be further controlled for temperature. The power supply, or test equipment coupled to the power supply, measures current for execution of the predefined workload by the processor, 306.

The test equipment or power supply provides the measured values to the processor similarly to how a VR would provide power measurements in operation of the device. The processor stores the measurements either in the processor in a ROM, or other storage, or in a ROM or storage that is external to the processor and accessible to the processor, 308. In one embodiment, in addition to current values, the system can also store environment values in the processor (or other storage), 310. Such environment variables can include information about voltage and/or temperature, such as a how the processor scales to changes in the environment.

In one embodiment, multiple separate workloads are tested. If there are more workloads to be executed, 312, the processor again executes at 304 and that part of the process repeats for all workloads. When there are no more workloads to be executed to gather expected data, 312, the process finishes.

It will be understood that expected values for a memory device will be loaded in a similar manner. Instead of, or in addition to, a workload executed on the processor, there would be one or more memory access workloads processed by the memory device to determine the expected values. Such values can be stored in the processor for later use in auto-calibration.

FIG. 4 is a flow diagram of an embodiment of a process for dynamically calibrating a processor to an associated voltage regulator. Process 400 is a process for dynamic auto-calibration by a processor. Process 400 can be used for auto-calibration of a VR associated with the processor and/or a VR associated with a memory device coupled to the processor. A control component (e.g., BIOS) detects or generates a calibration trigger, 402. The trigger can be an event such as boot-up, or a time, or a register triggered by an operating system to cause a calibration event on the next boot, or other trigger.

The processor executes a predefined workload, 404, to perform the calibration. The workload is the same workload as used to compute the stored expected values. The processor receives a current measurement from an associated VR via a VR interface, 406. The current measurement indicates a current value as measured by the VR for execution of the predefined workload. A PCU or other power manager on the processor accesses a stored expected current value that corresponds with a calibration point at which current was measured by the VR, 408. There can be multiple values stored, and each can correspond to a specific calibration point.

In one embodiment, the processor (e.g., through the power manager) calculates a static offset based on the measured and stored values, 410. In one embodiment, the processor calculates a first-order offset value (e.g., slope) based on the measured and stored values, 412. In one embodiment, the processor calculates a second-order offset value based on the measured and stored values, 414. The processor uses any calculated values to calibrate the processor by adjusting power management behavior of the power manager based on the offset calculations, 416. The offset calculations can be used by the power manager to build a table or list of corrected values for current. The corrected values are used in calculating power management behavior instead of the supplied values.

It will be understood that expected values for a memory device will be loaded in a similar manner. Instead of, or in addition to, a workload executed on the processor, there would be one or more memory access workloads processed by the memory device to determine the expected values. In one embodiment, calculated calibration factors can be used by the processor in interacting with the memory device. In one embodiment, the processor transmits the calibration factors to the memory device to allow the memory device to adjust its power operation based on the calibration factors.

Figure 5:
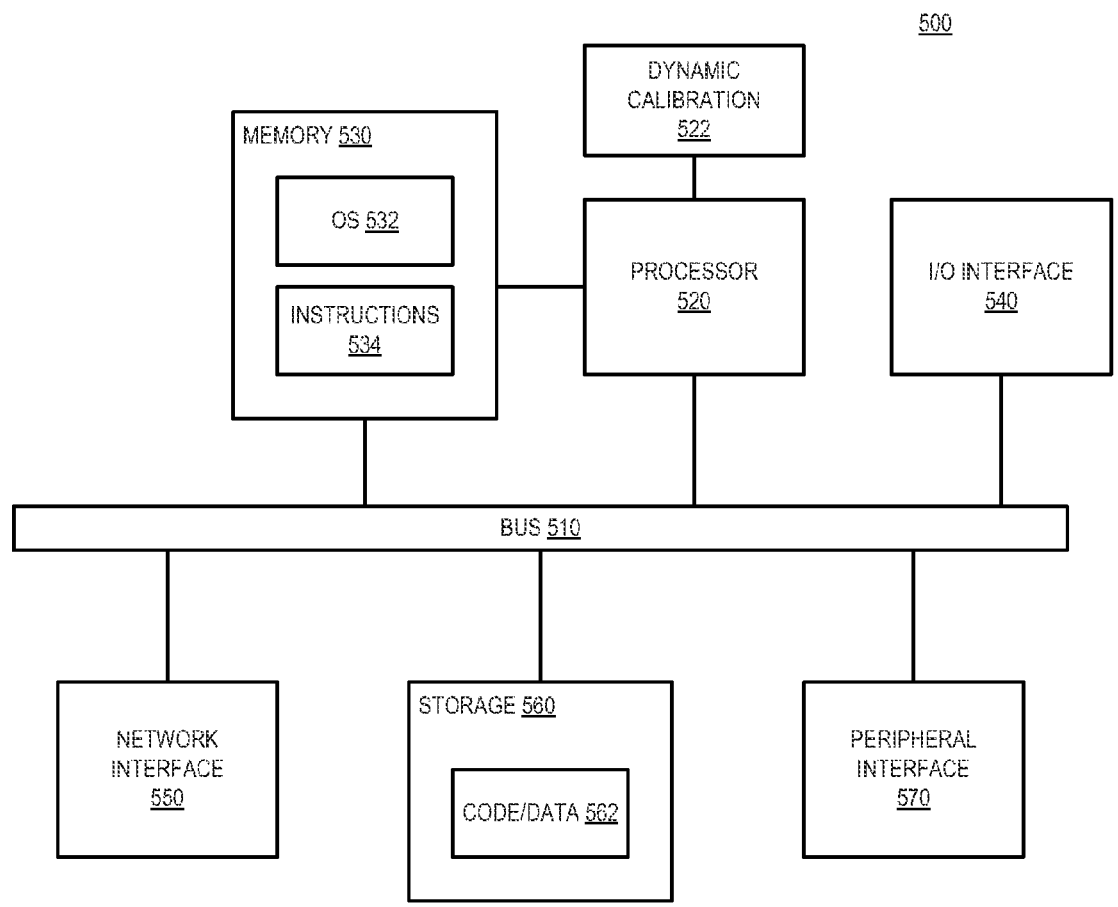
FIG. 5 is a block diagram of an embodiment of a computing system in which processor-assisted VR calibration can be performed.

FIG. 5 is a block diagram of an embodiment of a computing system in which I/O logic shutdown can be utilized. System 500 represents a computing device in accordance with any embodiment described herein, and can be a laptop computer, a desktop computer, a server, a gaming or entertainment control system, a scanner, copier, printer, or other electronic device. System 500 includes processor 520, which provides processing, operation management, and execution of instructions for system 500. Processor 520 can include any type of microprocessor, central processing unit (CPU), processing core, or other processing hardware to provide processing for system 500. Processor 520 controls the overall operation of system 500, and can be include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 530 represents the main memory of system 500, and provides temporary storage for code to be executed by processor 520, or data values to be used in executing a routine. Memory 530 can include one or more memory devices such as read-only memory (ROM), flash memory, one or more varieties of random access memory (RAM), or other memory devices, or a combination of such devices. Memory 530 stores and hosts, among other things, operating system (OS) 532 to provide a software platform for execution of instructions in system 500. Additionally, other instructions 534 are stored and executed from memory 530 to provide the logic and the processing of system 500. OS 532 and instructions 534 are executed by processor 520.

Processor 520 and memory 530 are coupled to bus/bus system 510. Bus 510 is an abstraction that represents any one or more separate physical buses, communication lines/interfaces, and/or point-to-point connections, connected by appropriate bridges, adapters, and/or controllers. Therefore, bus 510 can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire"). The buses of bus 510 can also correspond to interfaces in network interface 550.

System 500 also includes one or more input/output (I/O) interface(s) 540, network interface 550, one or more internal mass storage device(s) 560, and peripheral interface 570 coupled to bus 510. I/O interface 540 can include one or more interface components through which a user interacts with system 500 (e.g., video, audio, and/or alphanumeric interfacing). Network interface 550 provides system 500 the ability to communicate with remote devices (e.g., servers, other computing devices) over one or more networks. Network interface 550 can include an Ethernet adapter, wireless interconnection components, USB (universal serial bus), or other wired or wireless standards-based or proprietary interfaces.

Storage 560 can be or include any conventional medium for storing large amounts of data in a nonvolatile manner, such as one or more magnetic, solid state, or optical based disks, or a combination. Storage 560 hold code or instructions and data 562 in a persistent state (i.e., the value is retained despite interruption of power to system 500). Storage 560 can be generically considered to be a "memory," although memory 530 is the executing or operating memory to provide instructions to processor 520. Whereas storage 560 is nonvolatile, memory 530 can include volatile memory (i.e., the value or state of the data is indeterminate if power is interrupted to system 500).

Peripheral interface 570 can include any hardware interface not specifically mentioned above. Peripherals refer generally to devices that connect dependently to system 500. A dependent connection is one where system 500 provides the software and/or hardware platform on which operation executes, and with which a user interacts.

In one embodiment, system 500 includes dynamic calibration 522 for processor 520. Dynamic calibration 522 refers to the components described herein that enable processor-assisted VR calibration to be performed.

Figure 6:
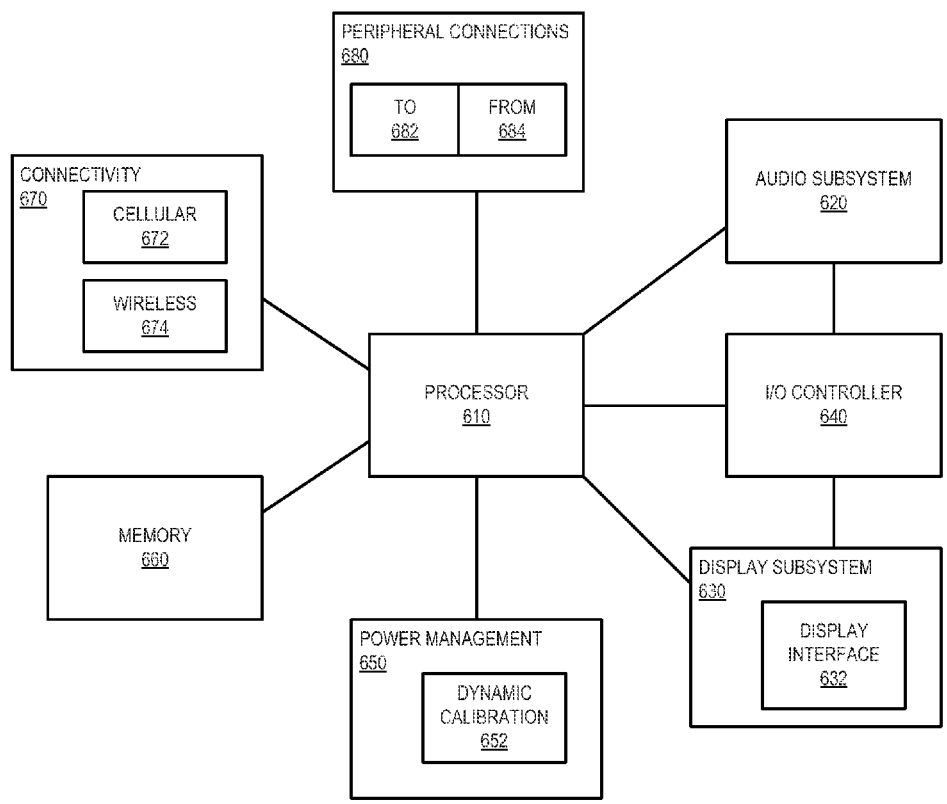
FIG. 6 is a block diagram of an embodiment of a mobile device in which processor-assisted VR calibration can be performed.

FIG. 6 is a block diagram of an embodiment of a mobile device in which processor-assisted VR calibration can be performed. Device 600 represents a mobile computing device, such as a computing tablet, a mobile phone or smartphone, a wireless-enabled e-reader, or other mobile device. It will be understood that certain of the components are shown generally, and not all components of such a device are shown in device 600.

Device 600 includes processor 610, which performs the primary processing operations of device 600. Processor 610 can include one or more physical devices, such as microprocessors, application processors, microcontrollers, programmable logic devices, or other processing means. The processing operations performed by processor 610 include the execution of an operating platform or operating system on which applications and/or device functions are executed. The processing operations include operations related to I/O (input/output) with a human user or with other devices, operations related to power management, and/or operations related to connecting device 600 to another device. The processing operations can also include operations related to audio I/O and/or display I/O.

In one embodiment, device 600 includes audio subsystem 620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into device 600, or connected to device 600. In one embodiment, a user interacts with device 600 by providing audio commands that are received and processed by processor 610.

Display subsystem 630 represents hardware (e.g., display devices) and software (e.g., drivers) components that provide a visual and/or tactile display for a user to interact with the computing device. Display subsystem 630 includes display interface 632, which includes the particular screen or hardware device used to provide a display to a user. In one embodiment, display interface 632 includes logic separate from processor 610 to perform at least some processing related to the display. In one embodiment, display subsystem 630 includes a touchscreen device that provides both output and input to a user.

I/O controller 640 represents hardware devices and software components related to interaction with a user. I/O controller 640 can operate to manage hardware that is part of audio subsystem 620 and/or display subsystem 630. Additionally, I/O controller 640 illustrates a connection point for additional devices that connect to device 600 through which a user might interact with the system. For example, devices that can be attached to device 600 might include microphone devices, speaker or stereo systems, video systems or other display device, keyboard or keypad devices, or other I/O devices for use with specific applications such as card readers or other devices.

As mentioned above, I/O controller 640 can interact with audio subsystem 620 and/or display subsystem 630. For example, input through a microphone or other audio device can provide input or commands for one or more applications or functions of device 600. Additionally, audio output can be provided instead of or in addition to display output. In another example, if display subsystem includes a touchscreen, the display device also acts as an input device, which can be at least partially managed by I/O controller 640. There can also be additional buttons or switches on device 600 to provide I/O functions managed by I/O controller 640.

In one embodiment, I/O controller 640 manages devices such as accelerometers, cameras, light sensors or other environmental sensors, gyroscopes, global positioning system (GPS), or other hardware that can be included in device 600. The input can be part of direct user interaction, as well as providing environmental input to the system to influence its operations (such as filtering for noise, adjusting displays for brightness detection, applying a flash for a camera, or other features).

In one embodiment, device 600 includes power management 650 that manages battery power usage, charging of the battery, and features related to power saving operation. Memory subsystem 660 includes memory devices for storing information in device 600. Memory 660 can include nonvolatile (state does not change if power to the memory device is interrupted) and/or volatile (state is indeterminate if power to the memory device is interrupted) memory devices. Memory 660 can store application data, user data, music, photos, documents, or other data, as well as system data (whether long-term or temporary) related to the execution of the applications and functions of system 600.

Connectivity 670 includes hardware devices (e.g., wireless and/or wired connectors and communication hardware) and software components (e.g., drivers, protocol stacks) to enable device 600 to communicate with external devices. The device could be separate devices, such as other computing devices, wireless access points or base stations, as well as peripherals such as headsets, printers, or other devices.

Connectivity 670 can include multiple different types of connectivity. To generalize, device 600 is illustrated with cellular connectivity 672 and wireless connectivity 674. Cellular connectivity 672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 674 refers to wireless connectivity that is not cellular, and can include personal area networks (such as Bluetooth), local area networks (such as WiFi), and/or wide area networks (such as WiMax), or other wireless communication. Wireless communication refers to transfer of data through the use of modulated electromagnetic radiation through a non-solid medium. Wired communication (including optical communication) occurs through a solid communication medium.

Peripheral connections 680 include hardware interfaces and connectors, as well as software components (e.g., drivers, protocol stacks) to make peripheral connections. It will be understood that device 600 could both be a peripheral device ("to" 682) to other computing devices, as well as have peripheral devices ("from" 684) connected to it. Device 600 commonly has a "docking" connector to connect to other computing devices for purposes such as managing (e.g., downloading and/or uploading, changing, synchronizing) content on device 600. Additionally, a docking connector can allow device 600 to connect to certain peripherals that allow device 600 to control content output, for example, to audiovisual or other systems.

In addition to a proprietary docking connector or other proprietary connection hardware, device 600 can make peripheral connections 680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

In one embodiment, power management 650 includes dynamic calibration 652 for processor 610. Dynamic calibration 652 refers to the components described herein that enable processor-assisted VR calibration to be performed.

Processor cores can be implemented in different ways, for different purposes, and in different processors. For instance, implementations of such cores can include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors can include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which can include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that can include on the same die the described CPU (sometimes referred to as the application core(s) or application processor(s)), the above described coprocessor, and additional functionality. Exemplary core architectures are described next, followed by descriptions of exemplary processors and computer architectures.

FIG. 7A is a block diagram illustrating an embodiment of both an exemplary in-order pipeline and an exemplary register renaming, out-of-order issue/execution pipeline. FIG. 7B is a block diagram illustrating an embodiment of both an exemplary embodiment of an in-order architecture core and an exemplary register renaming, out-of-order issue/execution architecture core to be included in a processor. The solid lined boxes in FIGS. 7A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724.

FIG. 7B shows processor core 790 including a front end unit 730 coupled to an execution engine unit 750, and both are coupled to a memory unit 770. The core 790 can be a reduced instruction set computing (RISC) core, a complex instruction set computing (CISC) core, a very long instruction word (VLIW) core, or a hybrid or alternative core type. As yet another option, the core 790 can be a special-purpose core, such as, for example, a network or communication core, compression engine, coprocessor core, general purpose computing graphics processing unit (GPGPU) core, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit 740 (or decoder) can decode instructions, and generate as an output one or more micro-operations, micro-code entry points, microinstructions, other instructions, or other control signals, which are decoded from, or which otherwise reflect, or are derived from, the original instructions. The decode unit 740 can be implemented using various different mechanisms. Examples of suitable mechanisms include, but are not limited to, look-up tables, hardware implementations, programmable logic arrays (PLAs), microcode read only memories (ROMs), or other mechanisms. In one embodiment, the core 790 includes a microcode ROM or other medium that stores microcode for certain macroinstructions (e.g., in decode unit 740 or otherwise within the front end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, or other scheduling mechanism. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), or other data types. In one embodiment, the physical register file(s) unit 758 comprises a vector register unit, a write mask register unit, and a scalar register unit. These register units can provide architectural vector registers, vector mask registers, and general purpose registers. The physical register file(s) unit(s) 758 is overlapped by the retirement unit 754 to illustrate various ways in which register renaming and out-of-order execution can be implemented (e.g., using a reorder buffer(s) and a retirement register file(s); using a future file(s), a history buffer(s), and a retirement register file(s); using a register maps and a pool of registers). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 can perform various operations (e.g., shifts, addition, subtraction, multiplication) and on various types of data (e.g., scalar floating point, packed integer, packed floating point, vector integer, vector floating point). While some embodiments can include a number of execution units dedicated to specific functions or sets of functions, other embodiments can include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each has its own scheduler unit, physical register file(s) unit, and/or execution cluster—and in the case of a separate memory access pipeline, certain embodiments are implemented in which only the execution cluster of this pipeline has the memory access unit(s) 764). It will be understood that where separate pipelines are used, one or more of these pipelines can be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 can include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 is coupled to one or more other levels of cache and eventually to a main memory.

By way of example, the exemplary register renaming, out-of-order issue/execution core architecture can implement the pipeline 700 as follows: 1) the instruction fetch 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units can be involved in the exception handling stage 722; and 8) the retirement unit 754 and the physical register file(s) unit(s) 758 perform the commit stage 724.

The core 790 can support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif., including the instruction(s) described herein. In one embodiment, the core 790 includes logic to support a packed data instruction set extension (e.g., AVX1, AVX2), thereby allowing the operations used by many multimedia applications to be performed using packed data.

It will be understood that the core can support multithreading (executing two or more parallel sets of operations or threads), and can do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it will be understood that register renaming can be used in an in-order architecture. While the illustrated embodiment of the processor also includes separate instruction and data cache units 734/774 and a shared L2 cache unit 776, alternative embodiments can have a single internal cache for both instructions and data, such as, for example, a Level 1 (L1) internal cache, or multiple levels of internal cache. In some embodiments, the system can include a combination of an internal cache and an external cache that is external to the core and/or the processor. Alternatively, all of the cache can be external to the core and/or the processor.

In one embodiment, a processor in accordance with the embodiment described includes power management that performs dynamic calibration for the processor with respect to an associated VR. Dynamic calibration components enable processor-assisted VR calibration to be performed. Expected values are compared to monitored values to determine calibration offset values.

Figure 8B:
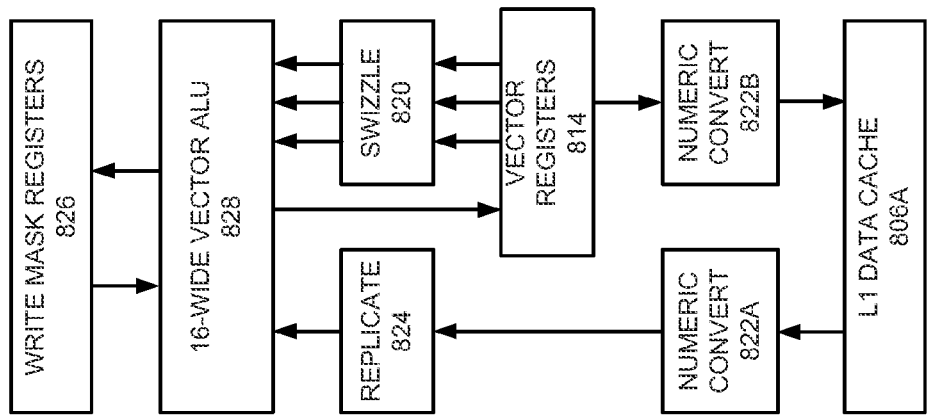
FIGS. 8A-B illustrate a block diagram of a more specific exemplary in-order core architecture, which core would be one of several logic blocks (including other cores of the same type and/or different types) in a chip.
Figure 8A:
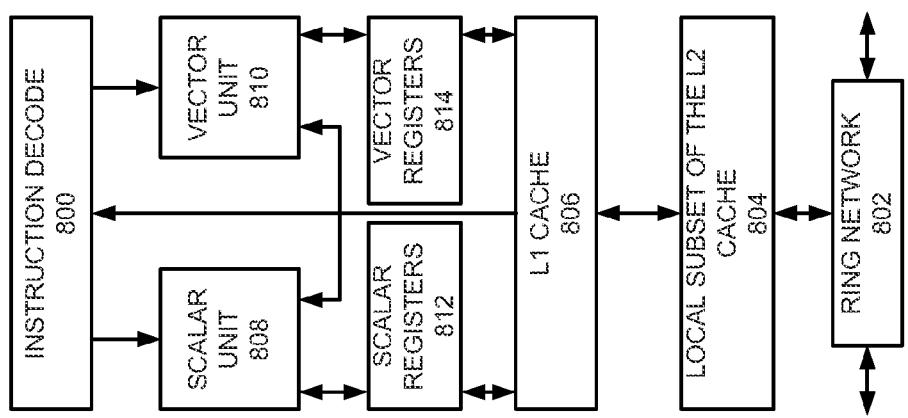

FIGS. 8A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 8A is a block diagram of an embodiment of a single processor core, along with its connection to the on-die interconnect network 802 and with its local subset of the Level 2 (L2) cache 804. In one embodiment, an instruction decoder 800 supports the x86 instruction set with a packed data instruction set extension. An L1 cache 806 allows low-latency accesses to cache memory into the scalar and vector units. While in one embodiment (to simplify the design), a scalar unit 808 and a vector unit 810 use separate register sets (respectively, scalar registers 812 and vector registers 814) and data transferred between them is written to memory and then read back in from a level 1 (L1) cache 806, alternative embodiments can use a different approach (e.g., use a single register set or include a communication path that allow data to be transferred between the two register files without being written and read back).

The local subset of the L2 cache 804 is part of a global L2 cache that is divided into separate local subsets, one per processor core. Each processor core has a direct access path to its own local subset of the L2 cache 804. Data read by a processor core is stored in its L2 cache subset 804 and can be accessed quickly, in parallel with other processor cores accessing their own local L2 cache subsets. Data written by a processor core is stored in its own L2 cache subset 804 and is flushed from other subsets, if necessary. The ring network ensures coherency for shared data. The ring network is bi-directional to allow agents such as processor cores, L2 caches and other logic blocks to communicate with each other within the chip. In one embodiment, each ring datapath is 1012-bits wide per direction.

FIG. 8B is an expanded view of one embodiment of part of the processor core in FIG. 8A. FIG. 8B includes an L1 data cache 806A part of the L1 cache 804, as well as more detail regarding the vector unit 810 and the vector registers 814. Specifically, the vector unit 810 is a 16-wide vector processing unit (VPU) (see the 16-wide ALU 828), which executes one or more of integer, single-precision float, and double-precision float instructions. The VPU supports swizzling the register inputs with swizzle unit 820, numeric conversion with numeric convert units 822A-B, and replication with replication unit 824 on the memory input. Write mask registers 826 allow predicating resulting vector writes.

In one embodiment, a processor in accordance with the embodiment described includes power management that performs dynamic calibration for one or more processor cores with respect to an associated VR. Dynamic calibration components enable processor-assisted VR calibration to be performed. Expected values are compared to monitored values to determine calibration offset values.

Figure 9:
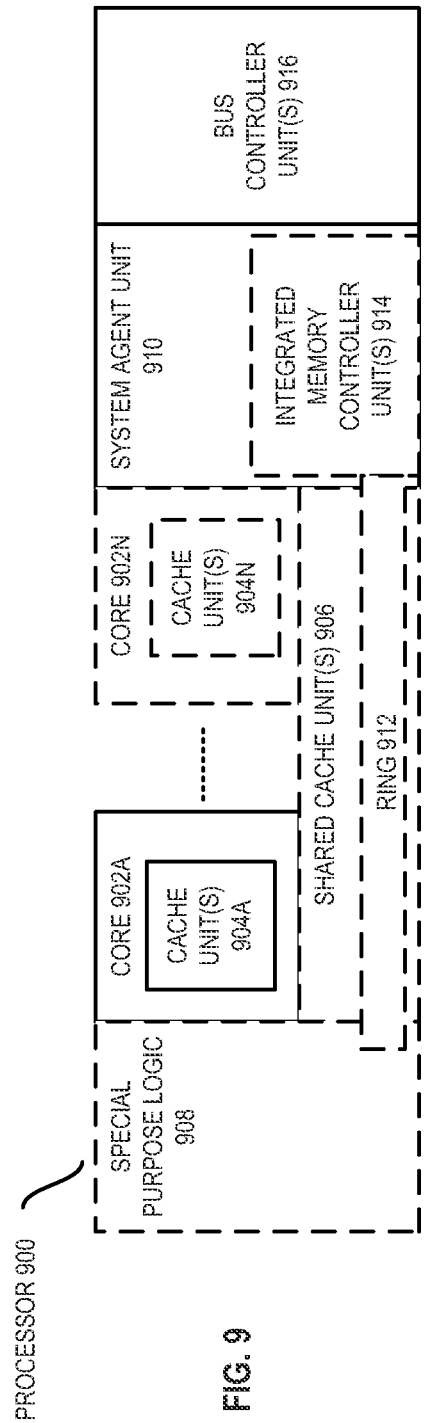
FIG. 9 is a block diagram of an embodiment of a processor that can have more than one core, an integrated memory controller, and/or integrated graphics.

FIG. 9 is a block diagram of an embodiment of a processor 900 that can have more than one core, can have an integrated memory controller, and can have integrated graphics. The solid lined boxes in FIG. 9 illustrate a processor 900 with a single core 902A, a system agent 910, a set of one or more bus controller units 916, while the optional addition of the dashed lined boxes illustrates an alternative processor 900 with multiple cores 902A-N, a set of one or more integrated memory controller unit(s) 914 in the system agent unit 910, and special purpose logic 908.

Thus, different implementations of the processor 900 can include: 1) a CPU with the special purpose logic 908 being integrated graphics and/or scientific (throughput) logic (which can include one or more cores), and the cores 902A-N being one or more general purpose cores (e.g., general purpose in-order cores, general purpose out-of-order cores, a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 can be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor can be implemented on one or more chips. The processor 900 can be a part of and/or can be implemented on one or more substrates using any of a number of process technologies, such as, for example, BiCMOS, CMOS, or NMOS.

The memory hierarchy includes one or more levels of cache within the cores, a set or one or more shared cache units 906, and external memory (not shown) coupled to the set of integrated memory controller units 914. The set of shared cache units 906 can include one or more mid-level caches, such as level 2 (L2), level 3 (L3), level 4 (L4), or other levels of cache, a last level cache (LLC), and/or combinations thereof. While in one embodiment a ring based interconnect unit 912 interconnects the integrated graphics logic 908, the set of shared cache units 906, and the system agent unit 910/integrated memory controller unit(s) 914, alternative embodiments can use any number of well-known techniques for interconnecting such units. In one embodiment, coherency is maintained between one or more cache units 906 and cores 902-A-N.

In some embodiments, one or more of the cores 902A-N are capable of multi-threading. The system agent 910 includes those components coordinating and operating cores 902A-N. The system agent unit 910 can include for example a power control unit (PCU) and a display unit. The PCU can be or include logic and components needed for regulating the power state of the cores 902A-N and the integrated graphics logic 908. The display unit is for driving one or more externally connected displays.

The cores 902A-N can be homogenous or heterogeneous in terms of architecture instruction set; that is, two or more of the cores 902A-N can be capable of execution the same instruction set, while others can be capable of executing only a subset of that instruction set or a different instruction set.

In one embodiment, a processor in accordance with the embodiment described includes power management that performs dynamic calibration for one or more processor cores with respect to an associated VR. Dynamic calibration components enable processor-assisted VR calibration to be performed. Expected values are compared to monitored values to determine calibration offset values.

FIGS. 10-13 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a variety of systems or electronic devices capable of incorporating a processor and/or other execution logic as disclosed herein are generally suitable.

Figure 10:
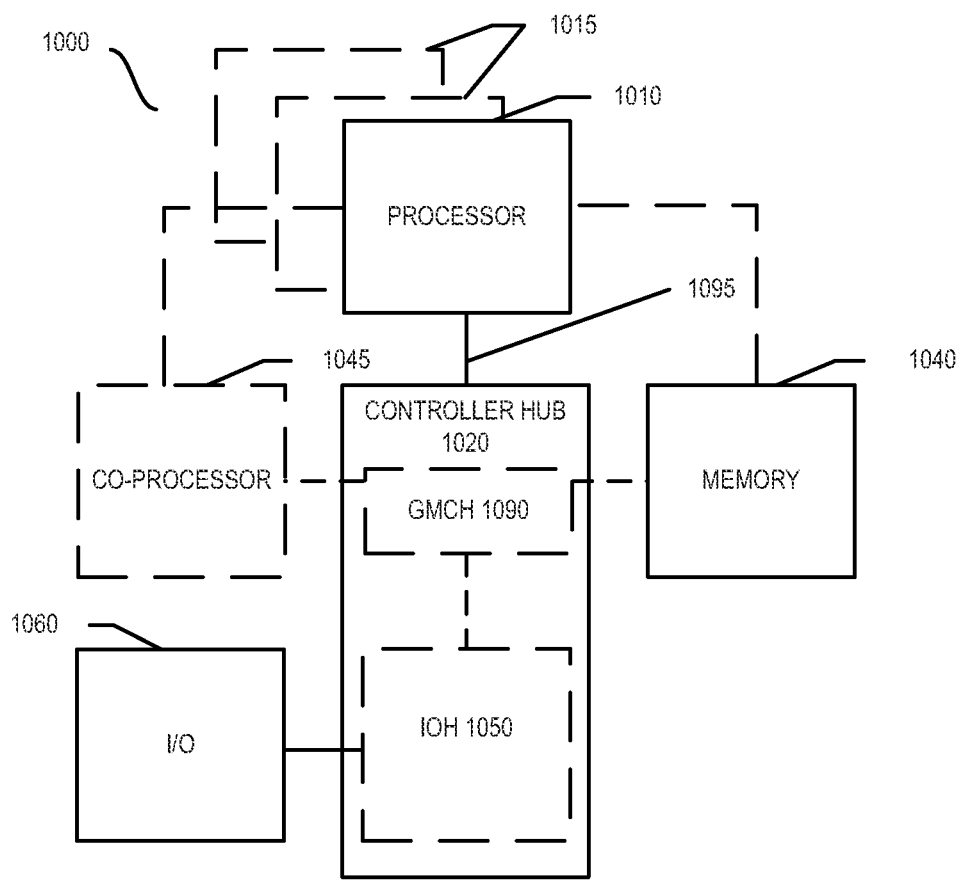
FIGS. 10-13 are block diagrams of exemplary computer architectures.

Referring now to FIG. 10, shown is a block diagram of an embodiment of a system 1000. The system 1000 can include one or more processors 1010, 1015, which are coupled to a controller hub 1020. In one embodiment the controller hub 1020 includes a graphics memory controller hub (GMCH) 1090 and an Input/Output Hub (IOH) 1050 (which can be on separate chips); the GMCH 1090 includes memory and graphics controllers to which are coupled memory 1040 and a coprocessor 1045; the IOH 1050 is couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 in a single chip with the IOH 1050.

The optional nature of additional processors 1015 is denoted in FIG. 10 with broken lines. Each processor 1010, 1015 can include one or more of the processing cores described herein and can be some version of the processor 900.

The memory 1040 can be, for example, dynamic random access memory (DRAM), phase change memory (PCM), or a combination of the two. For at least one embodiment, the controller hub 1020 communicates with the processor(s) 1010, 1015 via a multi-drop bus, such as a frontside bus (FSB), point-to-point interface such as QuickPath Interconnect (QPI), or similar connection 1095.

In one embodiment, the coprocessor 1045 is a special-purpose processor, such as, for example, a high-throughput MIC processor, a network or communication processor, compression engine, graphics processor, GPGPU, embedded processor, or the like. In one embodiment, controller hub 1020 can include an integrated graphics accelerator.

There can be a variety of differences between the physical resources 1010, 1015 in terms of a spectrum of metrics of merit including architectural, microarchitectural, thermal, power consumption characteristics, and the like.

In one embodiment, the processor 1010 executes instructions that control data processing operations of a general type. Embedded within the instructions can be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor(s) 1045 accept and execute the received coprocessor instructions.

In one embodiment, a processor in accordance with the embodiment described includes power management that performs dynamic calibration for the processor with respect to an associated VR. Dynamic calibration components enable processor-assisted VR calibration to be performed. Expected values are compared to monitored values to determine calibration offset values.

Figure 11:
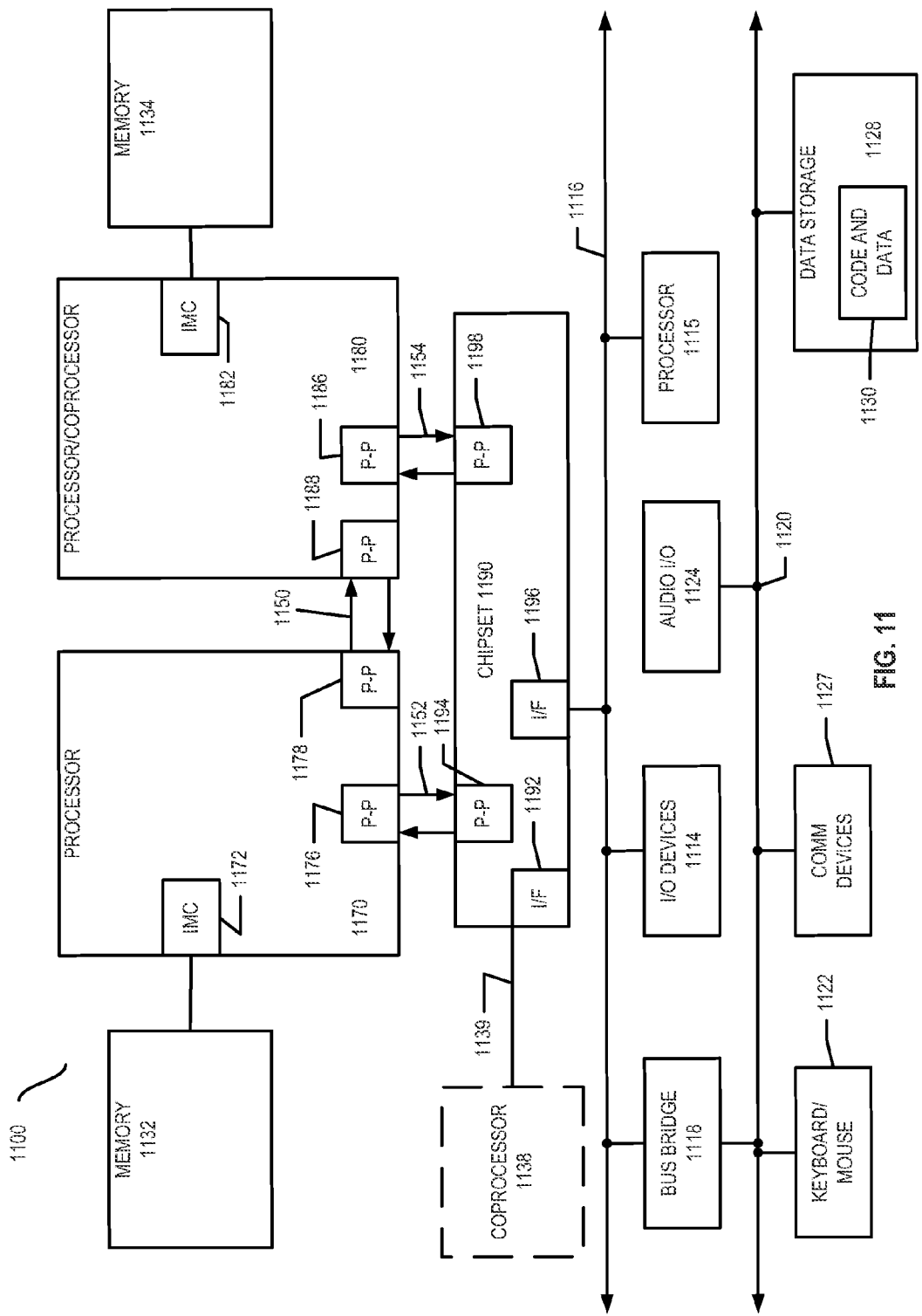

Referring now to FIG. 11, shown is a block diagram of an embodiment of a first more specific exemplary system 1100. As shown in FIG. 11, multiprocessor system 1100 is a point-to-point interconnect system, and includes a first processor 1170 and a second processor 1180 coupled via a point-to-point interconnect 1150. Each of processors 1170 and 1180 can be some version of the processor 900. In one embodiment, processors 1170 and 1180 are respectively processors 1010 and 1015, while coprocessor 1138 is coprocessor 1045. In another embodiment, processors 1170 and 1180 are respectively processor 1010 coprocessor 1045.

Processors 1170 and 1180 are shown including integrated memory controller (IMC) units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 can exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which can be portions of main memory locally attached to the respective processors.

Processors 1170, 1180 can each exchange information with a chipset 1190 via individual P-P interfaces 1152, 1154 using point to point interface circuits 1176, 1194, 1186, 1198. Chipset 1190 can optionally exchange information with the coprocessor 1138 via a high-performance interface 1139. In one embodiment, the coprocessor 1138 is a special-purpose processor, such as, for example, a high-throughput MIC processor, a network or communication processor, compression engine, graphics processor, GPGPU, embedded processor, or the like.

A shared cache (not shown) can be included in either processor or outside of both processors, yet connected with the processors via P-P interconnect, such that either or both processors' local cache information can be stored in the shared cache if a processor is placed into a low power mode.

Chipset 1190 can be coupled to a first bus 1116 via an interface 1196. In one embodiment, first bus 1116 can be a Peripheral Component Interconnect (PCI) bus, or a bus such as a PCI Express bus or another third generation I/O interconnect bus, but these are non-limiting examples.

As shown in FIG. 11, various I/O devices 1114 can be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) units), field programmable gate arrays, or any other processor, are coupled to first bus 1116. In one embodiment, second bus 1120 can be a low pin count (LPC) bus. Various devices can be coupled to a second bus 1120 including, for example, a keyboard and/or mouse 1122, communication devices 1127 and a storage unit 1128 such as a disk drive or other mass storage device which can include instructions/code and data 1130, in one embodiment. Further, an audio I/O 1124 can be coupled to the second bus 1120. Note that other architectures are possible. For example, instead of the point-to-point architecture of FIG. 11, a system can implement a multi-drop bus or other such architecture.

In one embodiment, a power control unit of the processor performs dynamic voltage supply calibration. Measured values of load under predetermined workloads can be compared against stored values to determine an offset.

Figure 12:
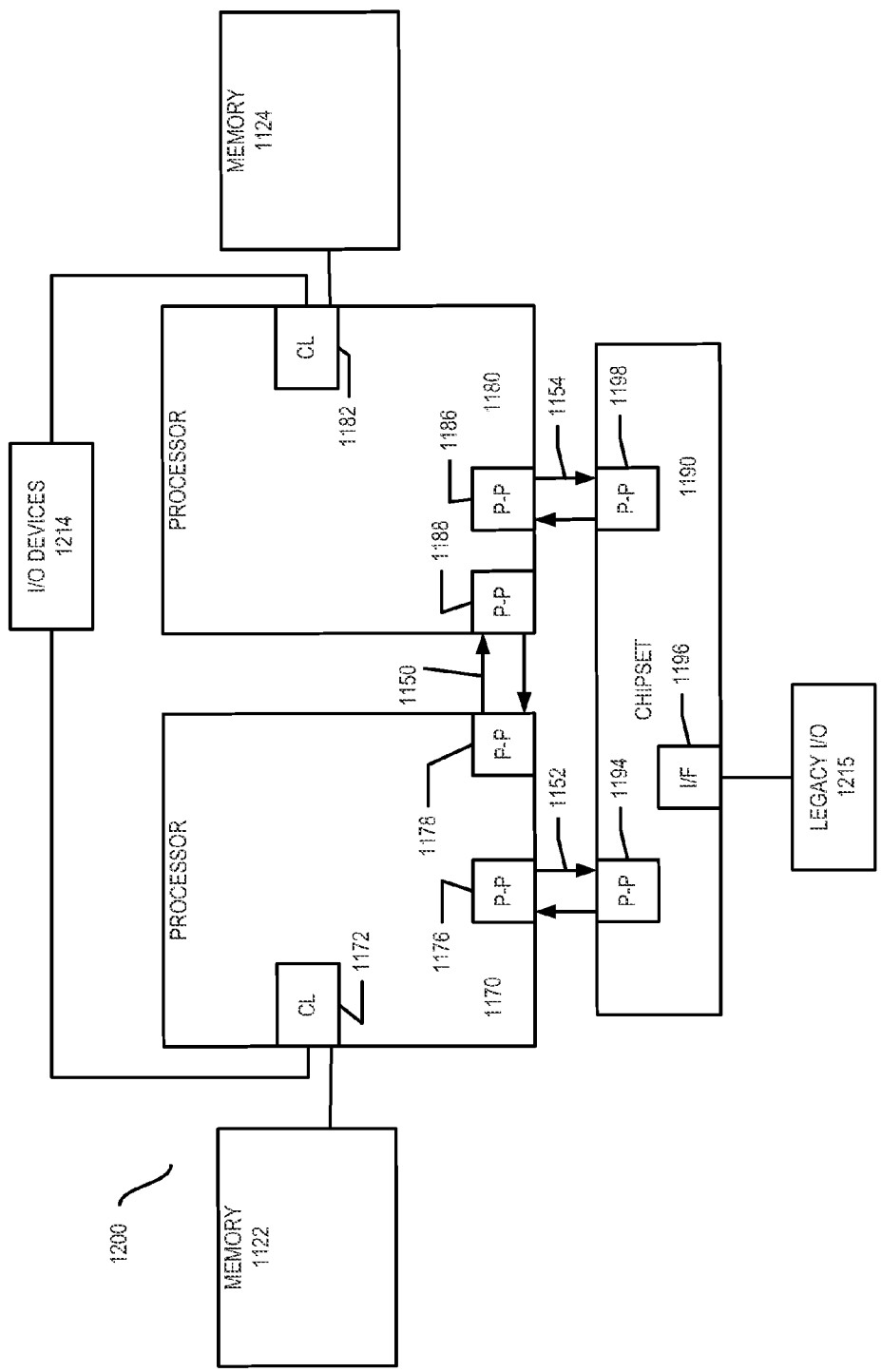

Referring now to FIG. 12, shown is a block diagram of an embodiment of a second more specific exemplary system 1200. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170, 1180 can include integrated memory and I/O control logic ("CL") 1172 and 1182, respectively. Thus, the CL 1172, 1182 include integrated memory controller units and include I/O control logic. FIG. 12 illustrates that not only are the memories 1132, 1134 coupled to the CL 1172, 1182, but also that I/O devices 1214 are also coupled to the control logic 1172, 1182. Legacy I/O devices 1215 are coupled to the chipset 1190.

In one embodiment, a power control unit of the processor performs dynamic voltage supply calibration. Measured values of load under predetermined workloads can be compared against stored values to determine an offset.

Figure 13:
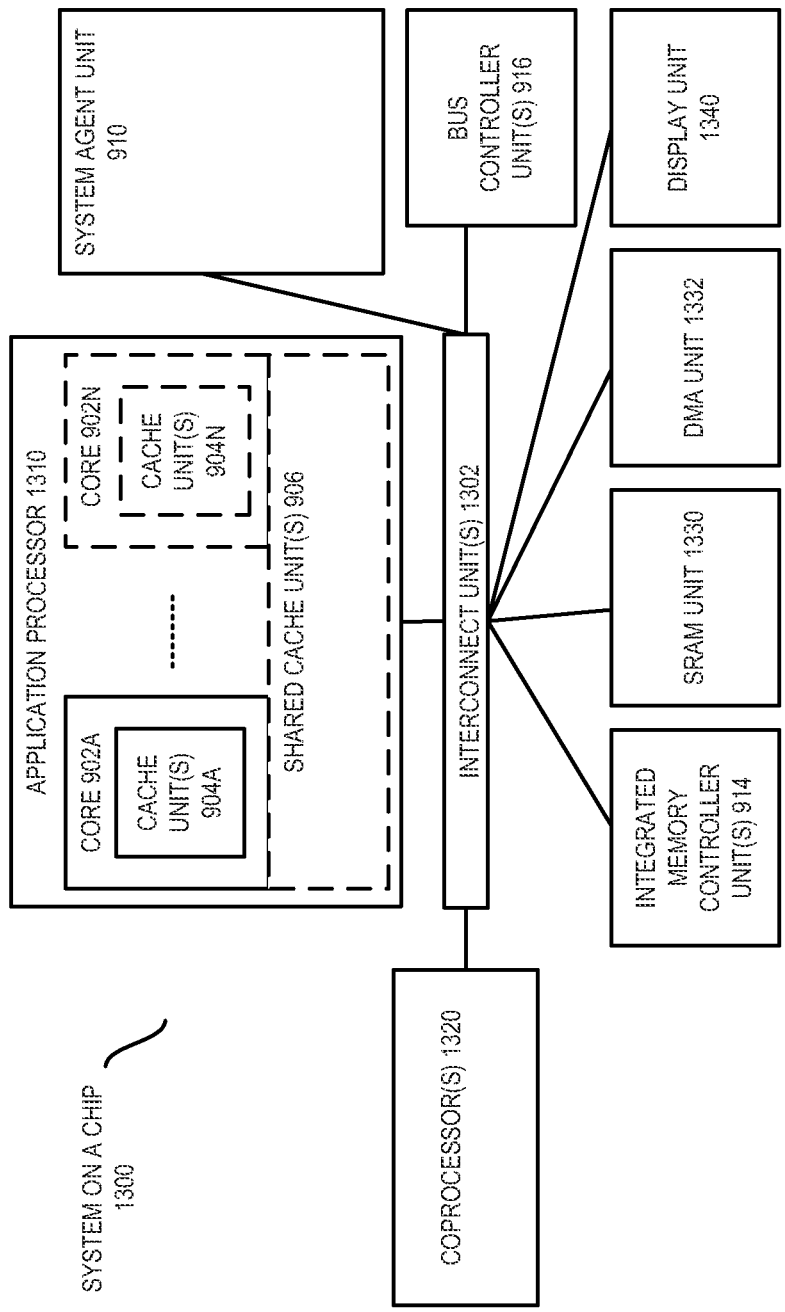

Referring now to FIG. 13, shown is a block diagram of an embodiment of a SoC 1300. Similar elements in FIG. 9 bear like reference numerals. Also, dashed lined boxes are optional features on more advanced SoCs. In FIG. 13, an interconnect unit(s) 1302 is coupled to: an application processor 1310 which includes a set of one or more cores 902A-N and shared cache unit(s) 906; a system agent unit 910; a bus controller unit(s) 916; an integrated memory controller unit(s) 914; a set or one or more coprocessors 1320 which can include integrated graphics logic, an image processor, an audio processor, and a video processor; an static random access memory (SRAM) unit 1330; a direct memory access (DMA) unit 1332; and a display unit 1340 for coupling to one or more external displays. In one embodiment, the coprocessor(s) 1320 include a special-purpose processor, such as, for example, a network or communication processor, compression engine, GPGPU, a high-throughput MIC processor, embedded processor, or the like.

Program code, such as code 1130 illustrated in FIG. 11, can be applied to input instructions to perform the functions described herein and generate output information. The output information can be applied to one or more output devices, in any known manner. For purposes of this application, a processing system includes any system that has a processor, such as, for example; a digital signal processor (DSP), a microcontroller, an application specific integrated circuit (ASIC), or a microprocessor.

The program code can be implemented in a high level procedural or object oriented programming language to communicate with a processing system. The program code can also be implemented in assembly or machine language, if desired. In fact, the mechanisms described herein are not limited in scope to any particular programming language. In any case, the language can be a compiled or interpreted language.

In some cases, an instruction converter can be used to convert an instruction from a source instruction set to a target instruction set. For example, the instruction converter can translate (e.g., using static binary translation, dynamic binary translation including dynamic compilation), morph, emulate, or otherwise convert an instruction to one or more other instructions to be processed by the core. The instruction converter can be implemented in software, hardware, firmware, or a combination thereof. The instruction converter can be on processor, off processor, or part on and part off processor.

FIG. 14 is a block diagram of one embodiment contrasting the use of a software instruction converter to convert binary instructions in a source instruction set to binary instructions in a target instruction set. In the illustrated embodiment, the instruction converter is a software instruction converter, although alternatively the instruction converter can be implemented in software, firmware, hardware, or various combinations thereof. FIG. 14 shows a program in a high level language 1402 can be compiled using an x86 compiler 1404 to generate x86 binary code 1406 that can be natively executed by a processor with at least one x86 instruction set core 1416. The processor with at least one x86 instruction set core 1416 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1404 represents a compiler that is operable to generate x86 binary code 1406 (e.g., object code) that can, with or without additional linkage processing, be executed on the processor with at least one x86 instruction set core 1416. Similarly, FIG. 14 shows the program in the high level language 1402 can be compiled using an alternative instruction set compiler 1408 to generate alternative instruction set binary code 1410 that can be natively executed by a processor without at least one x86 instruction set core 1414 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1412 is used to convert the x86 binary code 1406 into code that can be natively executed by the processor without an x86 instruction set core 1414. This converted code is not likely to be the same as the alternative instruction set binary code 1410 because an instruction converter capable of this is difficult to make; however, the converted code will accomplish the general operation and be made up of instructions from the alternative instruction set. Thus, the instruction converter 1412 represents software, firmware, hardware, or a combination thereof that, through emulation, simulation or any other process, allows a processor or other electronic device that does not have an x86 instruction set processor or core to execute the x86 binary code 1406.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:
    executing, by a processor, a predefined test workload;
    receiving at the processor a measurement by a voltage regulator that provides current, voltage, and power to the processor, the measurement indicating an amount of current drawn by the processor for execution of the predefined test workload as measured by the voltage regulator;
    accessing a stored value indicating an expected current for execution of the predefined test workload by the processor;
    calculating a calibration factor based on the measured current and the stored value; and
    adjusting power operation of the processor based on the calibration factor.

2. The method of claim 1, wherein executing the predefined test workload comprises:
    executing the predefined test workload in response to instructions from a BIOS (basic input/output system).

3. The method of claim 1, wherein the executing, accessing, calculating, and adjusting are performed at initialization of a system that includes the processor.

4. The method of claim 1, wherein receiving the measurement comprises:
    receiving at least one measurement made for a current lower than a thermal design current, and at least one measurement made for a current higher than the thermal design current.

5. The method of claim 1, wherein calculating the calibration factor further comprises:
    calculating a static offset.

6. The method of claim 1, wherein calculating the calibration factor further comprises:
    calculating a slope of a current-response line.

7. The method of claim 1, wherein calculating the calibration factor further comprises:
    calculating a second-order computation of a slope of a current-response line.

8. The method of claim 1, wherein the executing the predefined test workload further comprises:
    providing a memory access workload to a memory device coupled to the processor;
    receiving at the processor a measurement by a voltage regulator that provides current, voltage, and power to the memory device, the measurement indicating an amount of current drawn by the memory device for execution of the predefined test workload as measured by the voltage regulator;
    accessing a stored value indicating an expected current for execution of the predefined test workload by the memory device; and
    calculating a calibration factor based on the measured current and the stored value.

9. A method comprising:
receiving a calibration trigger by a processor, and, in response:
executing, by the processor, at least two predefined test workloads;
receiving, at the processor, at least two measurements by a reference power generator, the at least two measurements indicating an amount of current drawn by the processor for execution of each of the at least two predefined test workloads as measured by the power generator; and
storing the at least two measurements in the processor as expected currents for execution of the at least two predefined test workloads by the processor for a calculation of a calibration factor for dynamic runtime calibration.

10. The method of claim 9, wherein storing the at least two measurements comprises:
setting a read-only memory (ROM) with values of the at least two measurements.

11. The method of claim 9, wherein storing the at least two measurements comprises:
setting values of the at least two measurements into fuses on the processor.

12. The method of claim 9, wherein storing the at least two measurements further comprises:
storing environment values to indicate voltage and temperature environments under which the at least two predefined test workloads were executed.

13. The method of claim 12, wherein storing the environment values further comprises:
calculating scaling factors of the processor executing the at least two predefined test workloads based on temperature change.

14. The method of claim 12, wherein storing the environment values further comprises:
calculating scaling factors of the processor executing the at least two predefined test workloads based on source voltage changes.

15. A processor comprising:
execution hardware to execute, during a boot sequence, a predefined test workload in response to a trigger to perform a dynamic calibration, the trigger to be generated by a basic input/output system (BIOS) coupled to the processor;
an input path to receive a measurement by a voltage regulator that provides power to the processor, the measurement indicating an amount of current drawn by the processor for execution of the predefined test workload as measured by the voltage regulator;
a storage device to store a value indicating an expected current for execution of the predefined test workload by the processor; and
a power control unit (PCU) to access the stored value and the measurement, calculate a calibration factor based on the measured current and the stored value, and adjust power operation of the processor based on the calculated calibration factor.

16. The processor of claim 15, wherein the BIOS is to generate the trigger as part of a startup sequence.

17. The processor of claim 15, wherein receiving the measurement comprises:
receiving at least one measurement made for a current lower than a thermal design current, and at least one measurement made for a current higher than the thermal design current.

18. The processor of claim 15, wherein the PCU is to calculate the calibration factor including calculating a static offset.

19. The processor of claim 15, wherein the PCU is to calculate the calibration factor including calculating a slope of a current-response.

20. The processor of claim 15, wherein the PCU is to calculate the calibration factor including calculating a second-order computation of a slope of a current-response.

21. A system comprising:
a processor comprising:
execution hardware to execute a predefined test workload in response to a trigger to perform a dynamic calibration;
an input path to receive a measurement by a voltage regulator that provides power to the processor, the measurement indicating an amount of current drawn by the processor for execution of the predefined test workload as measured by the voltage regulator;
a storage device to store a value indicating an expected current for execution of the predefined test workload by the processor;
a power control unit (PCU) to access the stored value and the measurement, calculate a calibration factor based on the measured current and the stored value, and adjust power operation of the processor based on the calculated calibration factor; and
a hardware controller to manage a touchscreen interface device to receive input/output (I/O) to be processed by the processor.

22. The system of claim 21, the input path receiving the measurement comprises:
receiving at least one measurement made for a current lower than a thermal design current, and at least one measurement made for a current higher than the thermal design current.

23. The system of claim 21, wherein the PCU is to calculate the calibration factor including calculating a static offset.

24. The system of claim 21, wherein the PCU is to calculate the calibration factor including calculating a slope of a current-response.

25. The system of claim 21, wherein the PCU is to calculate the calibration factor including calculating a second-order computation of a slope of a current-response.

26. The system of claim 21, further comprising:
a memory device coupled to the processor, wherein the processor is to provide a predefined memory access workload to the memory device;
wherein the input path is to receive a measurement by a voltage regulator that provides current, voltage, and power to the memory device, the measurement indicating an amount of current drawn by the memory device for execution of the workload as measured by the voltage regulator; and
the PCU is to access a stored value indicating an expected current for execution of the predefined memory access workload by the memory device, and calculate a calibration factor based on the measured current and the stored value.

27. A method comprising:
executing by a memory device a predefined test workload;
receiving at a processor coupled to the memory device a measurement by a voltage regulator that provides current, voltage, and power to the memory device, the measurement indicating an amount of current drawn by the memory device for execution of the predefined test workload as measured by the voltage regulator;

accessing a stored value indicating an expected current for execution of the predefined test workload by the memory device; and calculating a calibration factor based on the measured current and the stored value.

28. The method of claim 27, wherein calculating the calibration factor further comprises:

calculating a static offset.

29. The method of claim 27, wherein calculating the calibration factor further comprises:

calculating a slope of a current-response line.

30. The method of claim 27, wherein calculating the calibration factor further comprises:

calculating a second-order computation of a slope of a current-response line.

* * * * *